Jan. 8, 1957. R. S. DAHLBERG, JR 2,777,054
FREQUENCY STABILIZED RADIO RELAY SYSTEM
Filed March 11, 1952
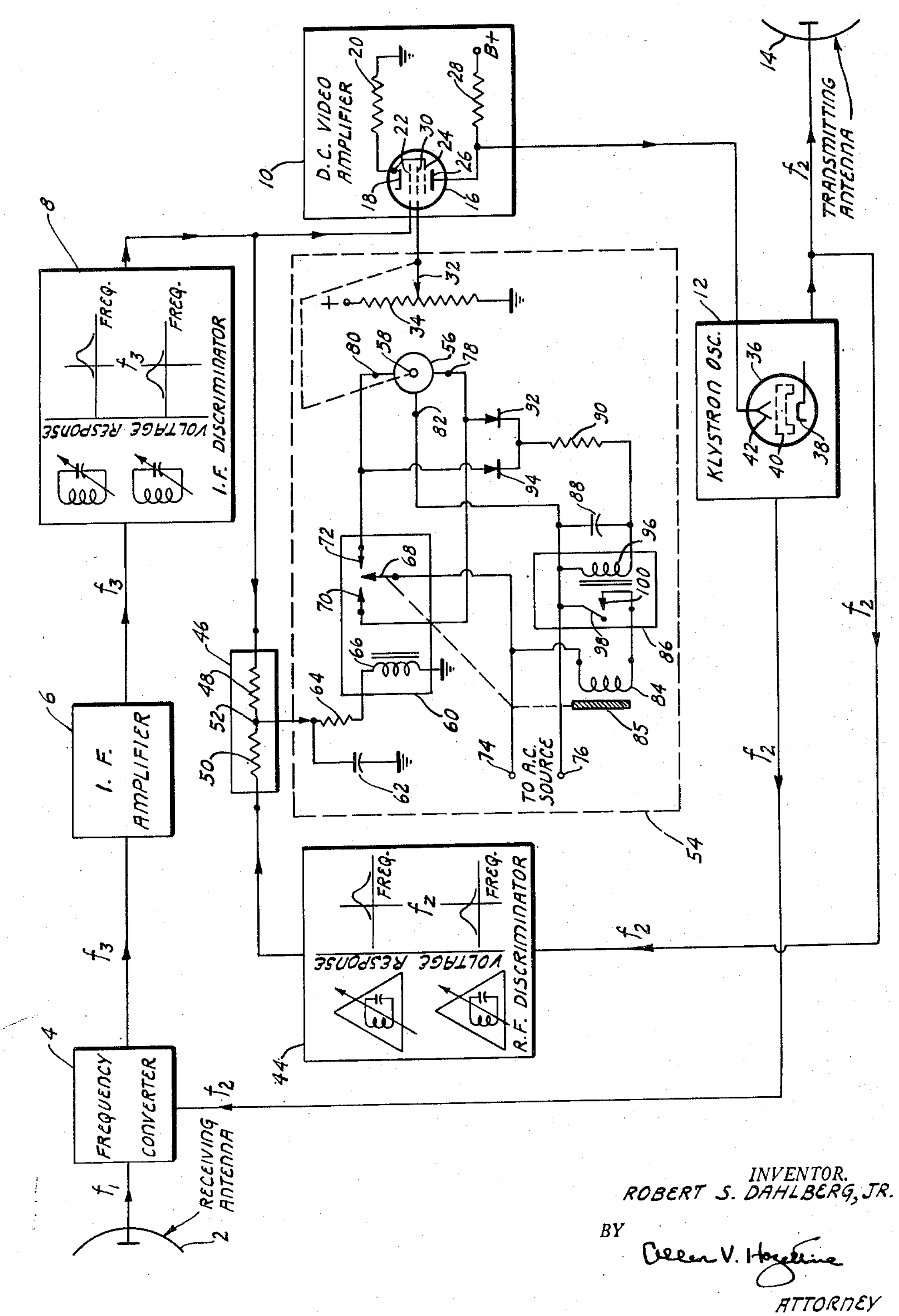
INVENTOR.
ROBERT S. DAHLBERG, JR.
BY [signature]
ATTORNEY 2,777,054
Patented Jan. 8, 1957

2,777,054

FREQUENCY STABILIZED RADIO RELAY SYSTEM

Robert S. Dahlberg, Jr., Roslyn, Pa., assignor to Philco Corporation, Philadelphia, Pa., a corporation of Pennsylvania Application March 11, 1952, Serial No. 275,939
12 Claims. (Cl. 250—15)

This invention relates to electrical systems and more particularly, to improved radio relay communication systems operating at microwave frequencies.

In their usual form, radio relay communication systems comprise two terminal stations between which are located one or more repeater stations. Each of these repeater stations is adapted to receive a signal from the preceding station of the system and to amplify and retransmit the intelligence contained in the received signal to the succeeding station of the system. In general, it has been the practice to assign different transmission frequencies to the successive stations of the system. By means of this method of frequency assignment, the possibility of interference which may result from the reception, at a given station, of a signal from a station other than the immediately preceding station of the system, is substantially eliminated. Furthermore, feedback of the transmitted signal into the receiver portion of a given station, is reduced to innocuous levels. Moreover, when superheterodyne receivers are used at the stations, as is usual in such installations, economies in circuit and utilization may be effected. For example, the frequency of the I.-F. channel of the receiver may be chosen equal to a desired difference between the frequency of the received signal and the frequency of the transmitted signal. In such a case, the oscillator of the transmitter may also be used as the local-oscillator of the receiver portion. In addition, the signal at the I.-F. frequency may be used as a frequency-controlling quantity to maintain the aforesaid oscillator at a fixed nominal difference frequency from the frequency of the received signal.

In the latter connection, an automatic frequency control (AFC) system of well-known construction may be employed at each repeater station to maintain the frequency of the transmitter oscillator at a value differing from the frequency of the received signal by an amount equal to the receiver intermediate frequency. In a typical form, such an AFC system may embody a discriminator having a cross-over point at the intermediate frequency. When such an AFC system is used, however, the closeness to which the frequency of the controlled oscillator can approach the desired frequency value is dependent not only on the stability of the discriminator but also on the frequency of the received signal, whereby departures of the latter signal from its assigned frequency bring about corresponding departures of the controlled frequency of the oscillator. The error so introduced in the transmission frequency of any given repeater station is therefore equal to the algebraic sum of the errors in the transmission frequency of each of the preceding stations in the system, plus the error produced by the instability of the I.-F. discriminator at the particular station. When the relay system contains a large number of repeater stations, such as is required for reliable long-distance transmission, the accumulated frequency errors at a particular intermediate station may be sufficient to cause that station to transmit on a frequency outside of the reception pass-band of the following station, and thereby disrupt the relay system.

It is an object of the invention to provide an improved radio relay communication system.

Another object of the invention is to provide an improved radio relay communication system embodying improved means for system frequency control.

A further object of the invention is to provide an improved radio relay communication system characterized by increased reliability and low cost.

A specific object of the invention is to provide an improved radio relay communication system in which the frequency of the transmitted signal of each of the repeater stations is held to a predetermined value within close tolerances.

In accordance with the invention, the foregoing objects are achieved, in a radio relay communication system of the above-described type, by providing, at a repeater station, means to produce a first control signal which is proportional to the amount of the frequency deviation from an assigned value, of the difference between the frequencies of the received and transmitted signals, and which has a sense determined by the sense of the frequency deviation. Furthermore, additional means are provided for producing a second control signal which is proportional to the amount of the frequency deviation from a second assigned value of the received or transmitted signal of the said repeater station, and which has a sense determined by the sense of the latter frequency deviation. The first and second signals so derived are combined to produce a resultant signal which, in turn, is employed to energize a control system which varies the frequency of the transmitter oscillator of the station in such a manner as to reduce the deviation from its assigned operating value.

In the preferred embodiment of the invention, the said second control signal is derived from the transmitted signal, and the said first and second control signals are so combined that the said resultant signal is equal to the algebraic sum of the said first and second control signals, each multiplied by a constant.

The invention will be described in greater detail with reference to the appended drawing forming part of the specification, the single figure of which is a diagram, partly schematic, of a microwave repeater station embodying the invention.

The microwave repeater station shown in the drawing comprises a superheterodyne receiver portion which accepts and demodulates frequency-modulated radio signals centered about a first nominal frequency value $f_1$, and a transmitter portion which provides a carrier signal having a second nominal frequency value $f_2$, which carrier signal is frequency-modulated by the demodulated signal provided by the receiver portion. The receiver portion comprises a receiving antenna 2, a frequency converter 4, an I.-F. amplifier 6, an I.-F. discriminator-detector 8 and a direct-coupled amplifier 10. The transmitter portion comprises a variable frequency oscillator 12 which may be a klystron oscillator as shown, and further comprises a transmitting antenna 14. The oscillator 12 is also coupled to the receiver portion of the station.

Frequency converter 4 is of conventional design, and may comprise a suitable detector and the usual input selective circuits (not shown) by means of which the converter is coupled to the antenna 2. The input circuits provide an input passband which is sufficiently wide to allow a predetermined deviation of the center frequency value of the received signal from its nominal value $f_1$, and to accept the sideband components of the signal within a specified deviation range. In a typical case, the input circuit of converter 4 may have a passband extending from 5940 to 5960 mc./sec.

The aforementioned detector, in general, consists of a non-linear electrical conductor which, in the specific embodiment of the invention herein described, may comprise a semi-conductor crystal such as a germanium crystal. In lower-frequency applications of the invention, the non-linear element may, in conformance with well-known practice, take the alternative form of an electron discharge tube comprising a plurality of electrodes.

By supplying to frequency converter 4 a heterodyning signal of nominal frequency value $f_2$ derived from the klystron oscillator 12, there is produced at the output of converter 4 a signal of nominal frequency value $f_3$, which frequency value is equal to the absolute amount of the difference between $f_1$ and $f_2$. This output signal is applied to the I.-F. amplifier 6.

The I.-F. amplifier 6 is of conventional design, and may comprise several vacuum-tube amplifier stages (not shown), some or all of which stages are intercoupled by means of bandpass networks (not shown), and may further comprise automatic gain control means (not shown). The bandpass of amplified 6 is centered about the intermediate frequency $f_3$ and is sufficiently wide to allow for a predetermined deviation of the frequency of the received signal from its nominal value and to pass the sideband components of the signal without distortion within a specified deviation range. In a typical case, the amplifier 6 may have a passband which is 10 mc./sec. wide, and is centered about a frequency of 90 mc./sec.

The I.-F. amplifier 6 is coupled to the input circuit of an I.-F. discriminator-detector 8 which may be of conventional form, e. g., a Travis-type discriminator-detector, as schematically indicated in the drawing.

Discriminator-detector 8 is, in turn, connected to the input circuit of the direct-coupled vacuum-type amplifier 10. Amplifier 10, as shown, comprises a multi-element electron discharge tube 16 having a cathode 18 connected to ground potential through a biasing resistor 20, a control grid 22 coupled to the output of discriminator-detector 8, a suppressor grid 24 directly connected to cathode 18 and an anode 26 connected to a source of positive potential (not shown) through a load resistor 28. The tube 16 further comprises a screen grid 30 connected to the movable arm 32 of a potentiometer 34, the ends of which are connected to the opposite poles of a voltage source (not shown). While a relatively simple form of the amplifier 10 has been shown, it is apparent that more complex forms of this amplifier may be used. For example, the amplifier may embody auxiliary circuits to provide inverse feedback of the applied signal, thereby to enhance the stability and linearity of the amplifier, and may further include insertion and/or multiplexing circuits, by means of which additional information signals may be added through amplifier 10 to the signal to be transmitted.

Amplifier 10 serves a three-fold purpose. More particularly, it provides the desired amplification of the demodulated signal derived from the discriminator-detector 8; it serves to frequency-modulate the variable frequency oscillator 12 in accordance with the magnitude of the amplified signal, and it further serves to control the center frequency of the variable frequency oscillator 12.

In a preferred form, the variable frequency oscillator 12 comprises a reflex klystron 36 containing a cathode source 38 of an electron beam, a cavity resonator 40 for velocity-modulating the beam, and a reflector electrode 42. Klystrons of this type and their use as oscillators are well known in the art, and are described, for example, in the publication, "Technique of Microwave Measurements," edited by Carol G. Montgomery, McGraw-Hill Book Company, Inc., New York, 1947, at pages 21 through 58 thereof. As noted in the said publication, the frequency of the wave generated by klystrons of the foregoing type may be varied by varying the potential applied to the reflector electrode 42, and accordingly a frequency-modulated signal may be derived from such klystrons.

In the arrangement shown in the drawing, the reflector electrode 42 is directly connected to the anode 26 of amplifier 10. Under this condition, changes in the potential of anode 26 produce corresponding changes in the potential of reflector electrode 42. Thus, the intelligence signal derived from discriminator-detector 8 and applied to control grid 22 will produce corresponding changes in the potential of reflector electrode 42 and, consequently, will produce frequency modulation of the signal generated by the klystron 36. The latter signal is supplied to antenna 14 for transmission to the next station in the relay system.

As previously pointed out, the oscillator 12 further serves to provide the local injection signal for the converter 4, the said signal being supplied to the converter at the frequency of the signal transmitted from the antenna 14. Suitable attenuating means (not shown) may be included between the oscillator 12 and the converter 4 to limit the energy supplied to the converter to the amount necessary to achieve efficient frequency conversion of the incoming signal. This injection signal, which is frequency-modulated in accordance with the detected intelligence, produces the desired heterodyning of the received signal to the frequency range of the I.-F. amplifier channel. This heterodyning action also produces a corresponding shrinkage of the frequency deviation of the intermediate frequency signal which would normally bring about a shrinkage of the deviation of the transmitted signal. In order to minimize the cumulative shrinkage in frequency deviation which would normally occur over the entire relay system because of the progressive shrinkage at each repeater station, the sensitivity of discriminator-detector 8 and the voltage gain of amplifier 10 are made sufficiently large so that the frequency deviations of oscillator 12 are substantially equal to the frequency deviation of the received signal. In a typical instance, these factors are adjusted so that the frequency deviation of oscillator 12 is at least 99% of the corresponding frequency deviation of the incoming signal to antenna 2.

It will be noted that departures of the incoming signal from the first nominal frequency value, or changes in the crossover frequency of the discriminator 8, produce a corresponding change in the reference level of the signal derived from discriminator-detector 8. These changes, when applied to the reflector electrode 40 of the klystron oscillator by the amplifier 10, normally tend to cause the oscillator 12 to follow these changes substantially to their full extent.

In accordance with the invention, this variation of the central frequency of oscillator 12 is significantly reduced by means now to be described. More particularly, the system of the invention embodies means to produce a first frequency-controlling quantity which is proportional to departures of a first signal appearing in the system from a first predetermined frequency value, and means to produce a second frequency-controlling quantity which is proportional to departures of a second signal appearing in the system from a second predetermined frequency value. The first and second controlling quantities so obtained are algebraically combined in a weighting network to produce a resultant quantity which is utilized to control the center frequency of oscillator 12.

In the specific arrangement shown, the first control quantity is a direct voltage $e_1$ which is derived from I.-F. discriminator-detector 8 and which has an amplitude proportional to the amount of the variation of the center frequency of the I.-F. signal from the cross-over frequency of the discriminator 8. The second control quantity is a direct voltage $e_2$ which is derived from an R.-F. discriminator-detector 44 coupled to the output circuit of klystron oscillator 12 and which has an amplitude proportional to the amount of the variation of the center frequency of the transmitted signal from the cross-over frequency of the discriminator 44. Discriminator-detector 44, symbolically indicated in the drawing as the microwave equivalent of the Travis circuit, may, of course, alternatively comprise any other of the well-known discriminators capable of operating at frequencies of the order herein involved.

The sign of each of these voltages, $e_1$ and $e_2$, is dependent on the sense of the variation of the center frequency of the given signal from the cross-over frequency of the given discriminator into which it is introduced and which produces the given voltage, and is further dependent on the sign of the slope of the characteristic of the given discriminator. In general, in a repeater station of given design, the relative signs of the said slopes for the two discriminators are determined by whether the nominal value $f_1$ of the frequency of the input signal is higher or lower than the nominal value $f_2$ of the frequency of the output signal. Thus, in the specific arrangement shown, when the repeater station is adapted to receive an input signal having a nominal frequency value higher than the nominal frequency value of the transmitted signal, the slopes of the discriminator characteristics are chosen to be of opposite sign, i. e., the slope of the characteristic of discriminator 8 may have a positive sign and the slope of the characteristic of discriminator 44 may have a negative sign. For a repeater station of similar design, in which the nominal frequency value of the input signal is lower than the nominal frequency value of the transmitted signal, the slopes of the characteristics of discriminators 8 and 44 respectively are chosen to be of the same sign, i. e., both slopes may be negative. For illustrative purposes, it is assumed in the following discussion that the nominal value $f_1$ of the frequency of the input signal is greater than the nominal value $f_2$ of the frequency of the transmitted signal, and that the slope of the characteristic of discriminator-detector 8 is positive, and the slope of the characteristic of discriminator-detector 44 is negative.

The two control quantities $e_1$ and $e_2$ are combined by means of a network 46 which comprises resistors 48 and 50 connected in series to the outputs of discriminator-detectors 8 and 44 respectively, whereby, at the junction 52 of the resistors, there is produced with respect to ground potential, a resultant voltage $e_3$. This resultant voltage is equal to $(k_1e_1+k_2e_2)$, where $k_1$ and $k_2$ are constants which, for a fixed load resistance between junction 52 and a point at ground potential, and for the fixed internal impedances of the discriminator-detectors 8 and 44, are determined by the values of resistors 48 and 50.

The values of $k_1$ and $k_2$ are determined by the relative amounts of control to be effected by the voltages $e_1$ and $e_2$ produced by the discriminators 8 and 44 respectively, by the sensitivities of the discriminators and by the sensitivity of the frequency controlling system. Values of $k_1$ and $k_2$ may be calculated from data giving the desired value of the ratio of $k_1e_1$ and $k_2e_2$, and the sensitivity of the discriminators 8 and 44.

In the preferred embodiment of the invention, the ratio $(k_1e_1/k_2e_2)$ is set at substantially 1:2 for a given frequency deviation, which means that the R.-F. discriminator-detector 44 has substantially twice the ability of discriminator-detector 8 to affect the frequency of klystron oscillator 12, in response to a signal of given frequency deviation. Appropriate values of the resistors 48 and 50 to achieve this ratio may be calculated by methods which are well-known in the art, and which are described, for example, at pages 629 through 648, of the publication "Waveforms," edited by Britton Chance, Vernon Hughes, Edward F. MacNichol, David Sayre and Frederick C. Williams, McGraw-Hill Book Co., Inc., New York, 1949. In a typical system embodying the invention, the ratio $(k_1e_1/k_2e_2)=1:2$ is substantially obtained when the aforementioned system parameters are adjusted to substantially the following values:

Sensitivity of I.-F. discriminator-detector 8=+1 volt per mc./sec. of positive frequency deviation Sensitivity of R.-F. discriminator-detector 44=−0.1 volt per mc./sec. of positive frequency deviation Internal resistance of discriminator-detector 8=2400 ohms Internal resistance of discriminator-detector 44=4400 ohms Load resistance between terminal 52 and ground potential (comprising a 1000 ohm resistor 64 and a 1000 ohm coil 66, in series connection)=2000 ohms Sensitivity of frequency control system 54, in terms of the aforementioned voltage $e_3$ required to actuate the control system=±1 millivolt Voltage output $e_1$ of discriminator-detector 8 required to actuate said frequency control system in the absence of other controlling signals, and the frequency deviation corresponding to the given $e_1$=0.4 volt, corresponding to 0.4 mc./sec. deviation Voltage output $e_2$ of discriminator-detector 44 required to actuate said frequency control system in the absence of other controlling signals, and the frequency deviation corresponding to the given $e_2$=0.02 volt, corresponding to 0.2 mc./sec. deviation $(k_1/k_2)$, calculated on the basis of the preceding parameters=1:20

Resistor 48 required to produce the above $(k_1e_1/k_2e_2)$= 8600 ohms

Resistor 50 required to produce the above $(k_1e_1/k_2e_2)$= 0.2 megohm

The resultant voltage $e_3$, obtained in the manner described above, is applied to a frequency-controlling circuit 54, coupled to the klystron oscillator 12. In the specific arrangement shown, this frequency-controlling circuit comprises the potentiometer 34, the movable arm 32 of which is connected, as previously described, to the screen grid 30 of amplifier 10. Variations in the position of movable arm 32, which may be brought about by means of a motor coupled thereto, produce corresponding changes in the anode current of tube 16, and hence, corresponding changes in the voltage of the reflector electrode 42, thereby varying the frequency of oscillation of the klystron 36. More specifically, when the arm 32 is moved to a position which causes the screen grid 30 to assume a more positive potential, the anode current of amplifier tube 16 is increased, with the result that the voltage of anode 26 and klystron reflector 42 is made more negative. This change in the potential of reflector 42, in turn, causes the oscillation frequency of klystron 36 to increase. Thus, as an overall result, an increase in the voltage of screen grid 30, produced by rotating potentiometer arm 32 in the appropriate sense, causes an increase in the output frequency of klystron oscillator 12, and conversely.

For rotating the arm 32 there is provided a bi-directional alternating-current motor 56, the output shaft 58 of which is mechanically coupled to potentiometer arm 32. The motor 56 may be of conventional form and may consist, for example, of an induction motor having individual field windings adapted to produce rotation of shaft 58 in opposite senses, according to the manner in which alternating current energy is applied to the said windings. For example, if the A.-C. source is connected to terminals 78 and 82 of the motor, the shaft 58 rotates in a clockwise sense, whereas if it is connected to terminals 80 and 82, the sense of rotation will be counterclockwise.

The direction of rotation of motor shaft 58 is, in turn, controlled by the operation of a relay 60 which is actuated by means of the resultant voltage $e_3$. In the arrangement shown, the relay 60 is a polarized relay having an actuating coil 66, an armature 68 and fixed contacts 70 and 72. Depending on the sense of the current through coil 66, as established by the polarity of the voltage $e_3$ at junction 52, the armature 68 of the relay is deflected toward either fixed contact 70 or fixed contact 72. Preferably, the armature 68 is made of a ferromagnetic material, and the contacts 70 and 72 are provided with holding magnets, so that when the armature 68 is deflected to a position close to either contact, the armature is drawn to, and securely locked in electrical connection with the particular contact.

Assuming that the input signal to antenna 2 increases in frequency from its assigned frequency, the nominal value $f_1$, a voltage $e_3$, which is positive with respect to ground potential and is of sufficient magnitude to actuate relay 60, appears at junction 52. Because of the polarity of the current through coil 66, armature 68 is drawn against fixed contact 72, so that terminals 80 and 82 of bi-directional motor 56 are connected to A.-C. input terminals 74 and 76. Under these conditions, the shaft 58 of the motor, and hence the movable arm 32 of potentiometer 34, rotate counter-clockwise at a low speed, e. g., 0.5 R. P. M. This counter-clockwise rotation of motor shaft 58, and of potentiometer arm 32, raises the potential applied to screen grid 30 of amplifier tube 16, causing thereby a decrease in the potential of anode 26. Since the anode 26 of tube 16 is directly connected to the reflector electrode 42 of klystron 36, a corresponding increase in the frequency of oscillator 12 is produced.

As the frequency of oscillator 12 begins to rise, the magnitude of the positive error signal $e_3$ decreases toward zero. This decrease occurs, in accordance with the invention, in the following manner: The deviation of the center frequency of the I.-F. signal from the nominal value $f_3$ is reduced by the rise in frequency of oscillator 12. As a consequence, the positive output voltage $e_1$ of discriminator-detector 8 decreases in value. In addition, R.-F. discriminator 44 introduces into weighting network 46 a negative voltage $e_2$, of increasing value in response to the positive deviation of the oscillator frequency from the cross-over frequency of the latter discriminator. Since the weighting network 46 combines signals $e_1$ and $e_2$ according to the equation $$e_3=(k_1e_1+k_2e_2)$$

as has already been pointed out, the value of the control voltage $e_3$ will become arbitrarily close to zero, at a frequency of oscillator 12 which differs from the nominal value $f_2$ by an amount which is significantly smaller than the error in the frequency of the input signal to antenna 2, which error initiated the operation of the frequency-controlling system 54.

The control system 54 shown in the drawing further comprises mechanical means to dislodge periodically the armature 68 from the particular contact against which it has been locked by the holding means above described. This periodic dislodgment insures that the rotation of the motor shaft 58 ceases when the voltage $e_3$ at junction 52 is reduced by the change in frequency of the oscillator 12 to a value insufficient to deflect fully the armature 68 toward one of the fixed contacts 70 or 72. The dislodging means comprise, in the present embodiment, an armature reset solenoid 84 having a plunger 85 which is coupled to the armature 68 and is adapted to force the armature away from the fixed contacts 70 and 72. The dislodging means further comprises a single-pole single-throw direct-current relay 86, a capacitor 88, a resistor 90 and rectifier elements 92 and 94. Although, for purposes of clarity with respect to the electrical connections, reset solenoid 84 is shown in the drawing as being physically separated from relay 60, in practice the reset solenoid is physically contained within the case of relay 60. The operation of the resetting system is as follows:

When either of the fixed contacts 70 or 72 is engaged by the armature 68, the alternating current applied to motor 56 is also introduced into one or the other of the rectifier elements 92 or 94, and the direct current so produced energizes the series circuit comprising resistor 90 and the shunt combination of a relay coil 96 and the capacitor 88. The time constant of the capacitor 88 and the resistor 90 is of such value that the direct voltage across the coil 96 builds up to a sufficiently large magnitude to actuate relay 86 only after a predetermined time has elapsed following the start of rotation of the motor shaft 58. In practice, this delay period is of the order of 0.25 second.

When the armature 98 of relay 86 is energized, it becomes positioned against a fixed contact 100 and connects the solenoid 84 to the A.-C. source at terminals 74 and 76. Thereupon, the plunger 85 thrusts armature 68 to a position between contacts 70 and 72. When this occurs, motor 56, relay coil 96 and reset solenoid 84 are de-energized, and the plunger 85 is returned to its inactive position, thus again permitting the armature 68 to be deflected toward one or the other of the contacts 70 or 72, as determined by the polarity of the voltage $e_3$ at the junction 52. When the motor 56 is de-energized, the shaft 58 ceases to rotate, and the control system 54 becomes passive. If the change in the frequency of klystron 36, brought about as above described, is insufficient to reduce the potential $e_3$ of junction 52 to a value less than that required to deflect fully the armature 68, the latter armature will once again close to the appropriate fixed contact, and the above-described control cycle will repeat itself. These repetitions continue until the voltage $e_3$ at junction 52 has been reduced below the magnitude required to actuate relay 60.

Relay 60, which has been described above as a sensitive, current-directional relay, generally has the form of a D'Arsonval galvanometer, coil 66 corresponding to the moving coil and armature 68 to the pointer. Because of this construction, the relay functions as a highly efficient electro-mechanical transducer. More particularly, when the armature 68 is moved rapidly, in response to the flow of a direct current through coil 66 or in response to a thrust from the reset plunger 85, there normally will be induced in the coil 66 a sizable back-E. M. F. pulse. To prevent this spurious pulse from being coupled through network 46 to grid 22 of D.-C. amplifier 10, thereby distorting the intelligence signal, a large-time-constant by-passing filter comprising a capacitor 62 and a resistor 64 may be provided across the relay 60. In addition to serving as part of the aforementioned filter, resistor 64 may also serve to adjust the sensitivity of relay 60.

It will be apparent to those skilled in the art that the input of R.-F. discriminator 44 may be alternatively coupled to the received signal, i. e., to the input of frequency converter 4, without modifying the basic operation of the system. In this latter instance, the cross-over frequency of the discriminator-detector 44 is changed to the nominal value $f_1$ of the frequency of the input signal.

An important advantage of the system of the invention is that errors normally produced in the output frequency of klystron oscillator 12 because of errors in the cross-over frequencies of discriminator-detectors 8 and 44 are reduced to a small percentage of the values of the discriminator errors, in a manner directly comparable to the reduction effected with respect to errors in the frequency of the input signal to antenna 2. Furthermore, should the preceding station of the relay system fail, so that no signal is received at the succeeding repeater station, the control of the frequency of the said succeeding station is immediately taken over by discriminator 44. Conversely, should the discriminator 44 fail at a given repeater station, the frequency of oscillator 12 remains under the control of the received signal.

While I have described my invention by means of specific examples and in specific embodiments, I do not wish to be limited thereto, for obvious modifications will occur to those skilled in the art without departing from the spirit and scope of the invention.

What I claim is:

1. A radio relay communication system comprising means to receive a first signal having a first nominal frequency value and undergoing first variations indicative of intelligence and means to transmit a second signal having a second nominal frequency value different from said first frequency value and undergoing second variations indicative of said intelligence, said system further comprising means to generate said second signal, means to combine said second signal with said first signal to produce a heterodyne wave having a third nominal frequency value and undergoing third variations indicative of said intelligence, means to derive from one of said signals a first control quantity having an amplitude value proportional to variations of the nominal frequency value of said one signal from a first given frequency value, means to derive from said heterodyne wave a second control quantity having an amplitude value proportional to variations of the nominal frequency value of said heterodyne wave from a second given frequency value, means to combine algebraically said first and said second control quantities to produce a resultant control quantity, means responsive to said resultant control quantity to control the said second nominal frequency value of said generator of said second signal, means to derive from said heterodyne wave a third signal undergoing variations indicative of said intelligence, and means responsive to said third signal for imparting said intelligence variations to said second signal.

2. A radio relay communication system according to claim 1, in which the said first control quantity is derived from the said second signal.

3. A radio relay communication system according to claim 2, in which the said means to derive the said first controlling quantity comprises a first discriminator-detector having a cross-over frequency value substantially equal to the said first given frequency value, and in which the said means to derive the said second controlling quantity comprises a second discriminator-detector having a cross-over frequency value substantially equal to the said second given frequency value.

4. A radio relay communication system according to claim 3, in which the said means to combine the said first and second controlling quantities comprises a network, said network comprising resistor elements interconnected in series relationship between the outputs of said first and second discriminator-detectors and in which the said resultant control quantity consists of a voltage derived from the interconnection of the said two elements, said voltage being equal to the algebraic sum of a first voltage proportional to the said first control quantity and a second voltage proportional to the said second control quantity.

5. A radio relay communication system according to claim 2, in which the said generator of the said second signal comprises a frequency-determining element responsive to a control voltage, and in which the said means responsive to the said resultant control quantity comprises a potentiometer for varying the amplitude of the said control voltage, a bi-directional motor for varying the said potentiometer, and means responsive to the said control quantity for energizing the said bi-directional motor.

6. A radio relay communication system comprising means to receive a first signal having a first nominal frequency value and undergoing first variations indicative of intelligence and means to transmit a second signal having a second nominal frequency value different from the said first frequency value and undergoing second variations indicative of said intelligence, said system further comprising means to generate the said second signal, said latter means comprising a frequency-determining element responsive to a control voltage, means to combine the said second signal with the said first signal to produce a heterodyne wave having a third nominal frequency value and undergoing third variations indicative of said intelligence, means comprising a first discriminator-detector to derive from the said second signal a first control quantity having an amplitude proportional to the amount of the variations of the nominal frequency value of the said second signal from a first given frequency value thereof, said first discriminator-detector having a cross-over frequency value substantially equal to the said first given frequency value, means comprising a second discriminator-detector to derive from the said heterodyne wave a second control quantity having an amplitude proportional to the amount of the variations of the nominal frequency value of the said heterodyne wave from a second given frequency value thereof, said second discriminator-detector having a cross-over frequency value substantially equal to the said second given frequency value, means to produce a resultant control voltage having a value equal to the algebraic sum of a first voltage proportional to said first control quantity and a second voltage proportional to said second control quantity comprising first and second resistor elements connected in series relationship between the outputs of said first and second discriminator-detectors, means to control the said second nominal frequency value of said generating means, said frequency-controlling means comprising a bi-directional motor, a potentiometer coupled to the said generating means and to the said motor and having a movable arm, controlling means to vary the sense and duration of rotation of the said motor, and means to apply the said resultant control voltage to the said controlling means, means to derive from said second discriminator-detector a third signal having variations indicative of said intelligence, and means responsive to said third signal for imparting said intelligence variations to said second signal.

7. A radio relay communication system according to claim 6, in which the said means to generate the said second signal comprises a reflex klystron having a reflector electrode adapted to vary the frequency of the said generating means in response to variations of a voltage applied thereto, said system further comprising a D.-C. amplifier coupled to the said second discriminator-detector, the said motor-driven potentiometer and the said reflector electrode, and said system being adapted to vary the said frequency of the said second signal by varying the said voltage applied to the said reflector electrode in accordance with variations in the position of the said movable arm.

8. A radio relay communication system according to claim 6, in which the said controlling means for varying the sense of rotation of the said motor comprises a polarized relay having a coil element coupled to the said interconnection of the said resistor elements, the said relay being actuated only when the said resultant voltage has a magnitude greater than a given threshold value.

9. A radio relay communication system according to claim 8, in which the said polarized relay further comprises an armature, two fixed contacts and means for locking said armature selectively to said fixed contacts, said system further comprising means to dislodge periodically the said armature from the said selected contact.

10. A radio relay communication system comprising means to receive a first signal having a first nominal frequency value and means to transmit a second signal having a second nominal frequency value different from the said first frequency value, said system further comprising means to generate the said second signal, said generating means comprising a reflex klystron having a reflector electrode adapted to vary the frequency of the said generating means in response to variations of a voltage applied thereto, input means for the said first signal, frequency conversion means coupled to the said input means and to the said generating means and adapted to combine the said first signal with the said second signal to produce a heterodyne wave having a third nominal frequency value, amplifier means for the said heterodyne wave, means comprising a first discriminator-detector coupled to the said generating means to derive from the said second signal a first control quantity having an amplitude proportional to the amount of the variations of the nominal frequency of the said second signal from a first given frequency value, said first discriminator-detector having a cross-over frequency value substantially equal to the said first given frequency value, means comprising a second discriminator-detector coupled to the said amplifier to derive from the said heterodyne wave a second control quantity having an amplitude proportional to the amount of the variations of the nominal frequency of the said heterodyne wave from a second given frequency value, said second discriminator-detector having a cross-over frequency value substantially equal to the said second given frequency value, means comprising first and second resistor elements connected in series relationship between the outputs of the said first and second discriminator-detectors, a polarized relay having a given actuation threshold level and comprising an energizing coil element, an armature, two fixed contacts and means for locking the said armature selectively to the said fixed contacts in response to an energizing voltage applied to the said coil element, a load impedance coupled to the junction of the said resistor elements, said load impedance comprising a third resistor element and the said coil element interconnected in series relationship, a capacitor shunting the said load impedance, a motor coupled to the said polarized relay and having a shaft rotatable in one direction upon contact of the said armature with one of the said fixed contacts, and rotatable in the opposite direction upon contact of the said armature with the other of the said fixed contacts, a potentiometer having a movable arm coupled to the said shaft of the said motor, a direct-coupled amplifier coupled to the said second discriminator-detector, the said potentiometer and the said reflector electrode of the said reflex klystron and adapted to vary the said voltage applied to the said reflector electrode in accordance with variations in the position of the said movable arm of the said potentiometer, and dislodging means adapted to dislodge the armature from the said selected fixed contact at a predetermined time after the actuation of the said relay by the said energizing voltage.

11. A radio relay communication system comprising means for receiving a first signal having a first nominal frequency value and undergoing first variations indicative of intelligence and means for transmitting a second signal having a second nominal frequency value different from the said first nominal frequency value and undergoing second variations indicative of said intelligence, said system further comprising means for generating the said second signal, means for combining the said second signal with the said first signal to produce a heterodyne wave having a third nominal frequency value and undergoing third variations indicative of said intelligence, means for deriving from one of the said signals a first control quantity having an amplitude value continuously proportional to the variations of the nominal frequency value of the said one signal from a first given frequency value, means for deriving from the said heterodyne wave a second control quantity having an amplitude value continuously proportional to variations of the nominal frequency value of the said heterodyne wave from a second given frequency value, means for algebraically combining the said first and second control quantities to produce a resultant control quantity, means responsive to the said resultant control quantity to control the said second nominal frequency value of the said generator of the said second signal, means for deriving from said heterodyne wave a third signal having variations indicative of said intelligence, and means responsive to said third signal for imparting said intelligence variations to said second signal.

12. A radio relay communication system according to claim 7, wherein said first and second resistor elements have respective values such that the variation of the magnitude of said resultant control voltage, produced in response to a given deviation of the frequency of said second signal from said first given frequency value, is substantially equal to twice the variation of the magnitude of said resultant control voltage, produced in response to a deviation, equal to said given deviation, of the frequency of said heterodyne wave from said second given frequency value.

References Cited in the file of this patent

UNITED STATES PATENTS

| | | |
|---|---|---|
| 2,148,532 | Chaffee | Feb. 28, 1939 |
| 2,407,212 | Tunick | Sept. 3, 1946 |
| 2,495,023 | Sebring et al. | Jan. 17, 1950 |
| 2,527,730 | Hoglund | Oct. 31, 1950 |
| 2,544,255 | Chireix | Mar. 6, 1951 |
| 2,558,100 | Rambo | June 26, 1951 |
| 2,614,211 | Goodall | Oct. 14, 1952 |
| 2,653,315 | Wheeler | Sept. 22, 1953 |
| 2,659,813 | Schelleng | Nov. 17, 1953 |